United States Patent
Ruiz

(10) Patent No.: US 7,404,566 B2
(45) Date of Patent: Jul. 29, 2008

(54) FLOOR SUSPENSION SYSTEM

(75) Inventor: Erwin Ruiz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 543 days.

(21) Appl. No.: 11/167,896

(22) Filed: Jun. 28, 2005

(65) Prior Publication Data

US 2006/0290083 A1  Dec. 28, 2006

(51) Int. Cl.
*B62D 33/08* (2006.01)
(52) U.S. Cl. ............... 280/43.13; 280/6.15; 280/6.156; 16/18 R; 16/33
(58) Field of Classification Search ............... 280/6.15, 280/5.2, 5.28, 6.154, 6.155, 6.156, 79.11, 280/79.2, 79.3, 79.4, 79.5, 79.6, 79.7, 35, 280/38, 42, 43; 16/32, 33, 18 B
See application file for complete search history.

(56) References Cited

U.S. PATENT DOCUMENTS

| | | | | |
|---|---|---|---|---|
| 1,785,646 A | * | 12/1930 | Pascoo | 280/5.28 |
| 2,639,925 A | * | 5/1953 | Miklos | 280/5.28 |
| 2,726,630 A | * | 12/1955 | Dickerson | 118/235 |
| 3,909,022 A | * | 9/1975 | Claxton | 280/6.155 |
| 4,534,575 A | * | 8/1985 | Grove et al. | 280/124.136 |
| 4,647,067 A | * | 3/1987 | Paquette et al. | 280/676 |
| 5,437,467 A | * | 8/1995 | Patin | 280/6.154 |
| 5,507,069 A | | 4/1996 | Willis | |
| 5,628,377 A | * | 5/1997 | Le Gloan | 180/21 |
| 5,871,218 A | | 2/1999 | Lepage et al. | |
| 5,903,956 A | | 5/1999 | Theising | |
| 6,454,286 B1 | * | 9/2002 | Hosino | 280/250.1 |
| 6,809,323 B2 | | 10/2004 | Hazelton | |
| 6,929,270 B1 | * | 8/2005 | Flagstad et al. | 280/79.11 |

\* cited by examiner

*Primary Examiner*—Christopher Ellis
*Assistant Examiner*—John D Walters
(74) *Attorney, Agent, or Firm*—Pillsbury Winthrop Shaw Pittman LLP

(57) ABSTRACT

A caster suspension system that employs a linkage between the two casters constraining one to rise when the other falls while keeping moment internal to the system such that there is no tipping of the load carried by the caster suspension system.

20 Claims, 2 Drawing Sheets

FLOOR SUSPENSION SYSTEM

BACKGROUND

All references cited in this specification, and their references, are incorporated by reference herein where appropriate for teachings of additional or alternative details, features, and/or technical background.

Disclosed in the embodiments herein are caster suspension systems designed to accommodate uneven or irregular surfaces. In one embodiment, there is provided a caster suspension system that employs a linkage between the two casters constraining one to rise when the other falls while keeping moment internal to the system such that there is no tipping of the load carried by the caster suspension system.

Casters are well known devices that assist in the mobility of a great variety of types of equipment. They are used in industry, in the home, in the medical field, and in general whenever it is desirable to move objects over a surface.

While casters function well on smooth surfaces they tend to operate less efficiently when used on uneven surfaces or surfaces which contain irregularities, or when small objects placed upon the surface are encountered by the casters. Accordingly casters have been devised which are better adapted to maneuver over uneven surfaces. However, such prior types of devices have functional characteristics which limit their suitability for certain applications.

Certain types of casters when used on uneven surfaces are inherently unstable and can cause objects supported by them to easily tip. The possibility of tipping is increased under certain circumstances, such as when changing direction or when such a type of caster is supporting and moving a load and then encounters an object on the surface which tends to restrict its forward travel.

Other certain special types of casters significantly and abruptly change their height when contacting objects on the surface. This, in turn, causes a bump which appears to abruptly change the height of the object that is supported by such a caster.

Still other prior types of casters are able to operate only one time, and must be reset after encountering an object. Still yet other prior types of casters tend to impact with objects located upon the surface, or when they encounter uneven surfaces, which in turn results in shock being transferred to the object supported.

Reaction forces and vibrations due to uneven positioning of an instrument with respect to the floor may be particularly problematic with precision instruments (such as photolithography machines used in semiconductor processing). For instance, a photolithography machine which is subject to vibratory motion may cause an image projected by the photolithography machine to move and, as a result, be aligned incorrectly on a projection surface such as a semiconductor wafer.

For several industry products, such as high production copiers/printers, their main structure has to be designed considering the effect of uneven floor to frame integrity. If the machine does not have a relatively rigid frame and is under an uneven floor scenario (e.g., fourth caster is not co-planar with three other casters), the frame may distort and create unpredictable alignments among the internal frame components, resulting in problems such as paper registration issues, copy quality and mechanical interference between components. While one may compensate for uneven floor effect by implementing a caster adjustment (de-racking) procedure at the site, the procedure may be inaccurate due to a failure to determine a realistic reference to which to square the machine frame. Another disadvantage is that if the machine is moved, the frame will deflect again and may need to be adjusted. The latter affects service trouble-shooting and installation lines.

FIGS. 1 and 2 illustrate prior art systems 10 employing a single four-bar linkage. In FIG. 1, casters 25, 25' are positioned in opposing directions and are linked through link connections 20, 20' to linkage bar 15. As moments 30, 30' are in opposition directions, load 40 is balanced. However, when casters 25, 25' are moved so as to be pointing in the same direction as shown in FIG. 2, moments 35, 35' are in the same direction and load 40 is not balanced and will tip. Accordingly, there exists today a need for a caster that is articulated to accommodate uneven surfaces and which is inherently stable.

REFERENCES

U.S. Pat. No. 5,507,069 discloses an articulated caster which provides a base having more than two casters attached thereto and disposed radially away from the approximate geometric center of the base. A pivot arm includes a pivot housing for receiving and maintaining a pivot ball therein. The pivot housing and pivot ball respectively each are provided with a pivot housing hole and a pivot ball hole which align together when the pivot ball is correctly disposed within the pivot housing.

U.S. Pat. No. 5,871,218 discloses a suspension device for preventing swivel wheel wobbling over uneven terrain of a cart, such as a shopping cart, equipped with a pair of laterally opposite swivel wheels. The suspension device consists of a rigid elongated cross-member, fixedly mounted to the cart frame; an elongated arm, defining first and second opposite ends; a first mount, for mounting the arm to the cross-member for relative movement thereabout, whereby the arm first and second ends are movable relative to the ground in opposite directions. A second mount rotatably mounts the two swivel wheels to corresponding opposite ends of the elongated arm, wherein the relative movement of the arm is responsive to ground terrain irregularities.

U.S. Pat. No. 5,903,956 discloses a three-wheel pivot-caster assembly that provides mobility for a power tool. The pivot-caster assembly includes a first frame assembly with two wheels and a second frame assembly that has a caster assembly which includes a swivel wheel.

U.S. Pat. No. 6,809,323 discloses a caster system that support portions of a stage apparatus which has a reaction frame and a stage assembly including a first caster component and at least a second caster component. The first caster component supports the stage assembly, while the second caster component supports the reaction frame and is vibrationally separated from the first caster component. The second caster component may be physically coupled to the first caster component to enable the first caster component, the second caster component, the reaction frame, and the stage assembly to be moved as a substantially single unit.

SUMMARY

Aspects disclosed herein include:

an assembly comprising a pair of casters, each caster being attached to a pitman, a frame comprising at least two pitman support features which house at least a portion of each of said pitmans configured so as to permit vertical motion of the pitman in the support but limit horizontal motion in the support, and a linkage system attaching to each of said pitmans, wherein said linkage system is operatively configured so as to cause one of the pitmans to move vertically downward when the other pitman is moved vertically upward and to hold the pitmans in place when there is no vertical motion of either pitman;

a caster load support system comprising a pair of casters, each attached to a pitman, a frame comprising two pitman support features configured to house at least a portion of said pitmans, and a linkage system attaching said pair of pitmans, said linkage system comprising a horizontal bar having a first end and a second end, a pair of first links each having a first end and a second end, the first end of each of said first links being pivotally attached to said first and second end of said horizontal bar in a manner to permit movement of said first link between an angle of about 35° to about 85° from horizontal defined by the horizontal bar, a pair of second links each being pivoted to the second end of each of said pair of first links, said second links being pivoted in a manner to permit movement between an angle of about 0° about 40° from horizontal defined by the horizontal bar, and a third pair of links, having a first end and a second end, and each of said third pair of links being pivotally attached to said second end of each of said second links and to said pitman; and an electrostatographic system supported by an assembly comprising at least two pitman support features which house at least a portion of each of said pitmans configured so as to permit vertical motion of the pitman in the support but limit horizontal motion in the support, and a linkage system attaching to each of said pitmans, wherein said linkage system is operatively configured so as to cause one of the pitmans to move vertically downward when the other pitman is moved vertically upward and to hold the pitmans in place when there is no vertical motion of either pitman.

BRIEF DESCRIPTION OF THE DRAWINGS

Various of the above mentioned and further features and advantages will be better understood from this description of embodiments thereof, including the attached drawing figures wherein.

DETAILED DESCRIPTION

Figure 1:
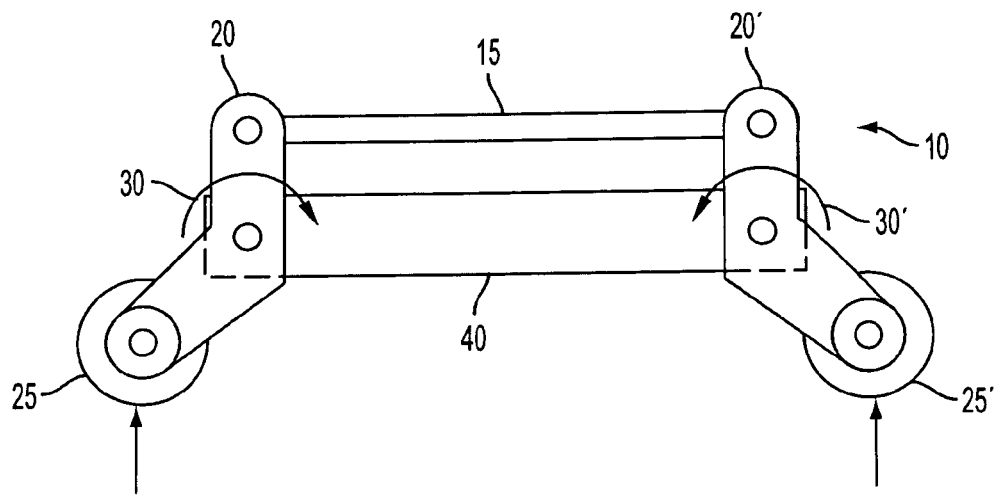
FIG 1 (prior art) shows a side diagrammatic view of a caster system employing a single four-bar linkage with moments in balance.
Figure 2:
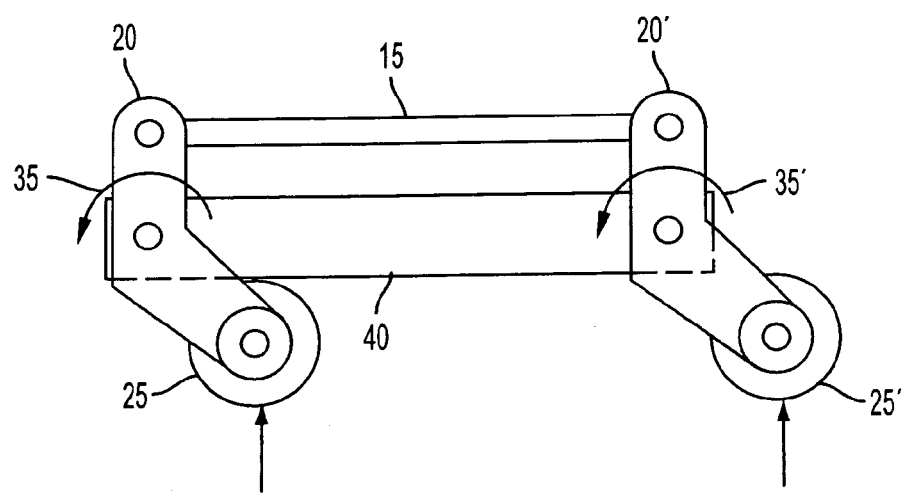
FIG. 2 (prior art) shows a side diagrammatic view of the caster system of FIG. 1 wherein moments are out of balance.

In embodiments there is illustrated an assembly comprising a pair of casters, each caster being attached to a pitman, a frame comprising at least two pitman support features which house at least a portion of each of said pitmans configured so as to permit vertical motion of the pitman in the support but limit horizontal motion in the support, and a linkage system attaching to each of said pitmans, wherein said linkage system is operatively configured so as to cause one of the pitmans to move vertically downward when the other pitman is moved vertically upward and to hold the pitmans in place when there is no vertical motion of either pitman.

In such embodiment, the linkage system may be symmetrical about a point between the castors, such as the mid-line between the pair of casters. In such symmetrical design, the moment on one side of the symmetry point may be designed to be in an opposite direction to the moment on the other side of the symmetry point to keep the moments in balance and the load from tipping, flexing or bending. The casters may be attached to the pitmans through a linkage element or directly thereto. The assembly may be used to move any load including, without limitation, a printer, copier, offset press, or combination thereof.

In one embodiment, there is provided a self-leveling suspension linkage that ensures four reaction points regardless of an uneven floor scenario. Such embodiment comprises a combination of multiple bar linkages connected from one caster to another. In such embodiment, a four caster frame utilizes two sets of linkages. Such embodiment may proffer the benefits of the frame being unaffected by an uneven floor, allow the casters to freely rotate without affecting linkage functionality, minimize misalignments between internal subsystems, minimize frame racking, and reduce set-up line.

In another embodiment, there is provided a caster load support system comprising a pair of casters, each attached to a pitman, a frame comprising two pitman support features (such as, without limitation, bands of material) configured to house the pitmans (or portion thereof), and a linkage system attaching the pair of pitmans. The linkage system may comprise a horizontal bar having a first end and a second end, a pair of first links each having a first end and a second end, the first end of each of said first links being pivotally attached to said first and second end of said horizontal bar in a manner to permit movement of said first link between an angle of about 35° to about 85°, alternatively between 45° and 75°, from horizontal defined by the horizontal bar, a pair of second links each being pivoted to the second end of each of said pair of first links, said second links being pivoted in a manner to permit movement between an angle of about 0° to about 40°, alternatively between 10° and 30°, from horizontal defined by the horizontal bar, and a third pair of links, having a first end and a second end, and each of said third pair of links being pivotally attached to said second end of each of said second links and to said pitman.

Figure 3:
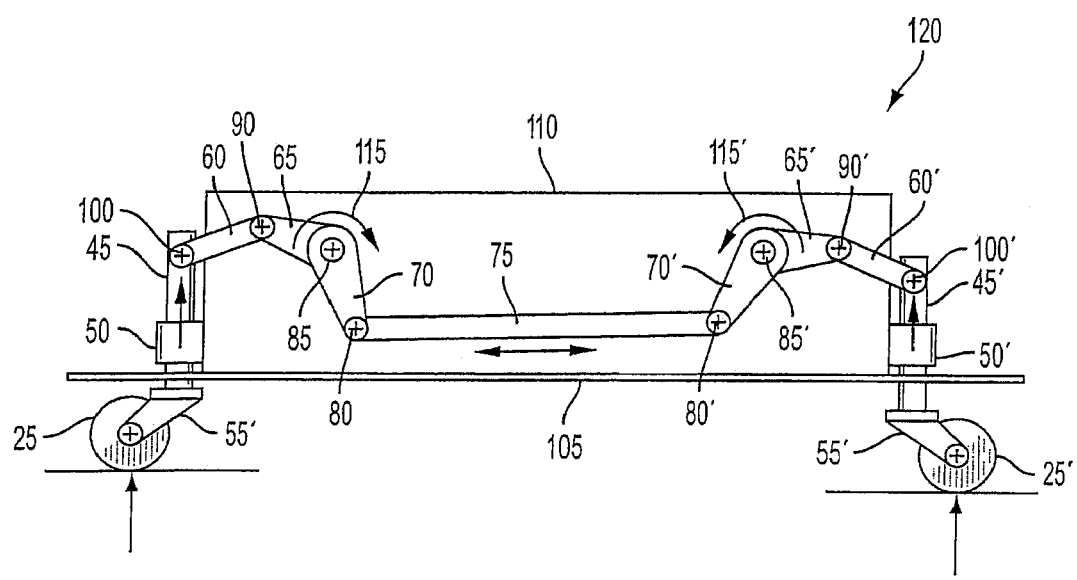
FIG. 3 shows a side diagrammatic view of a caster embodiment system of the present disclosure.

Now turning to FIG. 3, there is shown a diagrammatic side view of a self-leveling suspension linkage system embodiment of the present disclosure. As shown, horizontal link 75 divides the linkage system into two symmetrical parts, each comprising three link members 60, 65, 70, and 60', 65', 70' joined together through respective pivot points 100, 90, 85, 80 and 100', 90', 85', 80'. Linkage members 60 and 60' are pivotably attached respective to pitmans 45 and 45'. Pitmans 45, 45' are held in bushings 50, 50' (respectively) connected to a load 110 that permits vertical movement up and down but limits horizontal motion of the pitman. Pitmans 45, 45' extend through a load-supporting frame 105 and are attached through caster elements 55, 55' to caster 25, 25' (respectively). Alternatively, the caster elements 55, 55' may be attached to the pitmans through a linkage element (not shown). In such a system, when the moment 115 on one symmetrical side is opposed by the moment 115' on the other symmetrical side, the load 110 and system 120 remain in balance. When moments 115, 115' are in the same direction, the linkage system will cause one of casters 25 or 25' to move downward until it hits the floor. The moments will then be placed into check so as to be in the opposite direction from one another.

While the invention has been particularly shown and described with reference to particular embodiments, it will be appreciated that variations of the above-disclosed and other features and functions, or alternatives thereof, may be desirably combined into many other different systems or applications. Also that various presently unforeseen or unanticipated alternatives, modifications, variations or improvements

What is claimed is:

1. An assembly comprising a pair of casters, each caster being attached to a pitman, a frame comprising at least two pitman support features which house at least a portion of each of said pitmans configured so as to permit vertical motion of the pitman in the support only, and a linkage system attaching to each of said pitmans, wherein said linkage system is operatively configured so as to cause one of the pitmans to move vertically downward when the other pitman is moved vertically upward and to hold the pitmans in place when there is no vertical motion of either pitman.

2. An assembly in accordance with claim 1 wherein said pitman support features are bands of material.

3. An assembly in accordance with claim 1 wherein said linkage system comprises a plurality of pivotally linked linkages.

4. An assembly in accordance with claim 3 wherein said linkage system is symmetrical about a point between said casters.

5. An assembly in accordance with claim 4 wherein the symmetry point is about the mid-line between the pair of casters.

6. An assembly in accordance with claim 4 wherein a moment about said linkage system on one side of said symmetry point is in an opposite direction to a moment about said linkage system on the other side of said symmetry point.

7. An assembly in accordance with claim 1 wherein said casters are attached to said pitmans through a linkage element.

8. An assembly in accordance with claim 1 wherein said casters are directly attached to said pitmans.

9. An assembly in accordance with claim 1 wherein the frame supports a load.

10. An assembly in accordance with claim 9 wherein the load is an instrument.

11. A caster load support system comprising a pair of casters, each attached to a pitman, a frame comprising two pitman support features configured to house at least a portion of said pitmans so as to permit vertical motion of the pitman in the support only, and a linkage system attaching said pair of pitmans, said linkage system comprising a horizontal bar having a first end and a second end, a pair of first links each having a first end and a second end, the first end of each of said first links being pivotally attached to said first and second end of said horizontal bar in a manner to permit movement of said first link between an angle of about 35" to about 85", from horizontal defined by the horizontal bar, a pair of second links each being pivoted to the second end of each of said pair of first links, said second links being pivoted in a manner to permit movement between an angle of about 0" to about 40°, from horizontal defined by the horizontal bar, and a third pair of links, having a first end and a second end, and each of said third pair of links being pivotally attached to said second end of each of said second links and to said pitman.

12. A caster bed support system in accordance with claim 11 wherein said pitman support features are bands of material.

13. A caster load support system in accordance with claim 11 wherein said linkage system is symmetrical about a point between said casters.

14. A caster load support system in accordance with claim 13 wherein said symmetry point is about the mid-line between the pair of casters.

15. A caster load support system in accordance with claim 11 wherein said casters are attached to said pitmans through a linkage element.

16. A caster load support system in accordance with claim 11 wherein said casters are directly attached to said pitmans.

17. A caster load support system in accordance with claim 11, wherein the load is an instrument.

18. A caster load support system in accordance with claim 17 wherein said instrument is a printer, a copier, or an offset press, or combination thereof.

19. An electrostatographic system supported by an assembly comprising at least two pitman support features which house at least a portion of each of said pitmans configured so as to permit vertical motion of the pinion in the support only, and a linkage system attaching to each of said pitmans, wherein said linkage system is operatively configured so as to cause one of the pitmans to move vertically downward when the other pitman is moved vertically upward and to hold the pitmans in place when there is no vertical motion of either pitman.

20. An electrostatographic system in accordance with claim 19 wherein the electrostatographic system is a xerographic system.

* * * * *